(12) United States Patent
Griffiths

(10) Patent No.: US 7,349,530 B2
(45) Date of Patent: *Mar. 25, 2008

(54) METHODS AND SYSTEMS FOR PROVIDING USAGE PATTERN SERVICE FOR TELECOMMUNICATIONS CUSTOMERS

(75) Inventor: Michael A. Griffiths, Duluth, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 372 days.

This patent is subject to a terminal disclaimer.

(21) Appl. No.: 11/179,832

(22) Filed: Jul. 12, 2005

(65) Prior Publication Data

US 2005/0249342 A1    Nov. 10, 2005

Related U.S. Application Data

(63) Continuation of application No. 09/938,922, filed on Aug. 24, 2001, now Pat. No. 6,937,710.

(51) Int. Cl.
*H04M 15/00* (2006.01)

(52) U.S. Cl. .............................. 379/121.04; 379/112.06

(58) Field of Classification Search ........... 379/112.06, 379/121.04, 114.01, 120
See application file for complete search history.

(56) References Cited

U.S. PATENT DOCUMENTS

| 5,430,719 | A | 7/1995 | Weisser |
| 5,917,817 | A | 6/1999 | Dunn et al. |
| 6,125,173 | A | 9/2000 | Jagadish et al. |
| 6,487,401 | B2 | 11/2002 | Suryanarayana et al. |
| 6,493,547 | B1 | 12/2002 | Raith |
| 2003/0008635 | A1 | 1/2003 | Ung et al. |
| 2003/0045266 | A1 | 3/2003 | Staskal et al. |

*Primary Examiner*—Barry Taylor
(74) *Attorney, Agent, or Firm*—Cantor Colburn LLP

(57) ABSTRACT

Methods and systems are disclosed for providing a usage pattern for a customer of an intelligently-switched telecommunications system. The usage pattern provides historical information concerning the customer's use of the telecommunications system. One embodiment includes communicating either with the telecommunications system or with a data network and receiving a query for the customer's usage pattern. The query could originate from the customer using a computer device operating on the data network or from the customer using a telephonic/wireless device operating on the telecommunications system. The usage pattern is acquired from either a service control point operating on the telecommunications system or a database operating on the data network. The usage pattern is then communicated to the customer along either the data network or the telecommunications system, whereby the customer uses the computer device, or the telephonic/wireless device, to access the usage pattern.

12 Claims, 11 Drawing Sheets

METHODS AND SYSTEMS FOR PROVIDING USAGE PATTERN SERVICE FOR TELECOMMUNICATIONS CUSTOMERS

CROSS-REFERENCE TO RELATED APPLICATIONS

This application is a continuation of U.S. patent application Ser. No. 09/938,922 filed Aug. 24, 2001, the contents of which are incorporated by reference herein in their entirety.

NOTICE OF COPYRIGHT PROTECTION

A portion of the disclosure of this patent document and its figures contain material subject to copyright protection. The copyright owner has no objection to the facsimile reproduction by anyone of the patent document of the patent disclosure, but otherwise reserves all copyrights whatsoever.

BACKGROUND OF THE INVENTION

1. Field of the Invention

This invention generally relates to telephony and, more particularly, to methods and systems for permitting a customer to access historical information concerning their use of plain, old telephone service, wireless service, and other telecommunications services.

2. Description of the Related Art

Many telephone customers utilize monthly package service or measured-use service. Monthly package service is particularly used by wireless telephone customers. Monthly package service charges the customer a monthly fee for limited wireless use. A wireless customer, for example, may pay $29.99 for 150 minutes of monthly wireless use. Measured-use service provides a plain, old telephone service customer with a standard number of telephone calls per month. A measured-use customer usually pays a small monthly fee ($8.95) for thirty (30) telephone calls per month. The monthly package service is very popular with wireless telephone customers, and the measured-use service appeals to customers on fixed-incomes or to customers requiring infrequent telephone use.

Customers, however, often complain about their monthly package service and/or their measured-use service. Although each service limits the customer's telephone use, customers often have no knowledge of their monthly usage. Most customers, in fact, don't know they exceeded their permitted use until a billing statement arrives. By then, of course, the customer has already entered a new billing cycle. Customers have no way of learning their current use and, thus, no opportunity to curtail their use to avoid excessive charges.

Customers also complain about unknown telephone numbers dialed from their phone. A customer's monthly billing statement only provides a long list of called telephone numbers. If a customer spots an unknown telephone number, the customer has no convenient method of learning the identity of the unknown telephone number. Customers, therefore, often call their service provider and ask a customer representative for listing information. These calls prevent the limited number of customer service representatives from taking more important service-related calls.

There is, accordingly, a need in the art for customers to quickly and easily learn their monthly use of telephone/wireless service, a need for a convenient and simple method of helping customers avoid excessive use charges, a need for reducing the number of non-value added calls to customer service representatives, a need for a customer-initiated usage management service, and a need for a customer usage pattern service that is inexpensive to operate and to maintain.

BRIEF SUMMARY OF THE INVENTION

The aforementioned problems are reduced by a Personal Call Manager. The Personal Call Manager comprises computer programs, computer systems, and telephone systems that allow a customer to manage their telephone/wireless use. The Personal Call Manager allows the customer to retrieve their usage pattern. A customer's "usage pattern" provides real-time and historical information concerning the customer's use of the telecommunications system. The usage pattern, for example, shows, or audibly tells, the customer, at any time, how many calls they have made, the charges incurred thus far, and how many minutes or calls are remaining on their monthly plan. Customers may view their usage pattern on a computer over the Internet. Customers, instead, could call a nationwide access number and have their usage patent "read" to them over the phone. Customers may now know their telephone/wireless use at any time during a billing cycle. Customers can monitor their use and, if needed, curtail their use before incurring excessive charges.

Customers may advantageously access their usage pattern on a computer or on a telephone. The Personal Call Manager allows the customer to retrieve their usage pattern using a computer connected to the Internet or other data network. The customer accesses the proper website, requests their usage pattern, and then views their usage pattern. The Personal Call Manager allows the customer to view, for example, the number of telephone calls made by the customer, the number of telephone calls received by the customer, and even the number of minutes or of calls remaining on their monthly usage plan. If the customer, instead, chooses to use a telephone, the customer can dial the nationwide access number and "hear" their usage pattern. Enhanced features, for either a computer or a telephone, would allow the customer to learn the listed name and the listed address for any unrecognized telephone number (listing information for an unlisted number preferably should not be divulged). Customers could also learn who called, but, hung up before the customer had a chance to answer. The Personal Call Manager, even more conveniently, could provide a "click-to-dial" feature that easily allows the customer to call a telephone number. Customers could even customize the Personal Call Manager to provide whatever information the customer feels helps them best manage their telecommunications use.

Customers and service providers benefit from the present invention. Because customers may now quickly and easily learn the remaining, unused minutes in their billing cycle, the present invention is of great benefit to those wireless customers on monthly package plans. Measured-use customers also greatly benefit by quickly learning the number of calls remaining in their billing cycle. A customer may simply access their usage pattern and view, or hear, their remaining usage. Customer may thus reduce unexpected billing surprises and any possible financial repercussions. Because customers may also quickly and easily learn the identity of unrecognized telephone numbers, fewer customers call the service provider. Service representatives are thus better utilized on more pressing concerns.

BRIEF DESCRIPTION OF THE SEVERAL VIEWS OF THE DRAWINGS

These and other features, aspects, and advantages of the present invention are better understood when the following Detailed Description of the Invention is read with reference to the accompanying drawings, wherein.

DETAILED DESCRIPTION OF THE INVENTION

Figure 1:
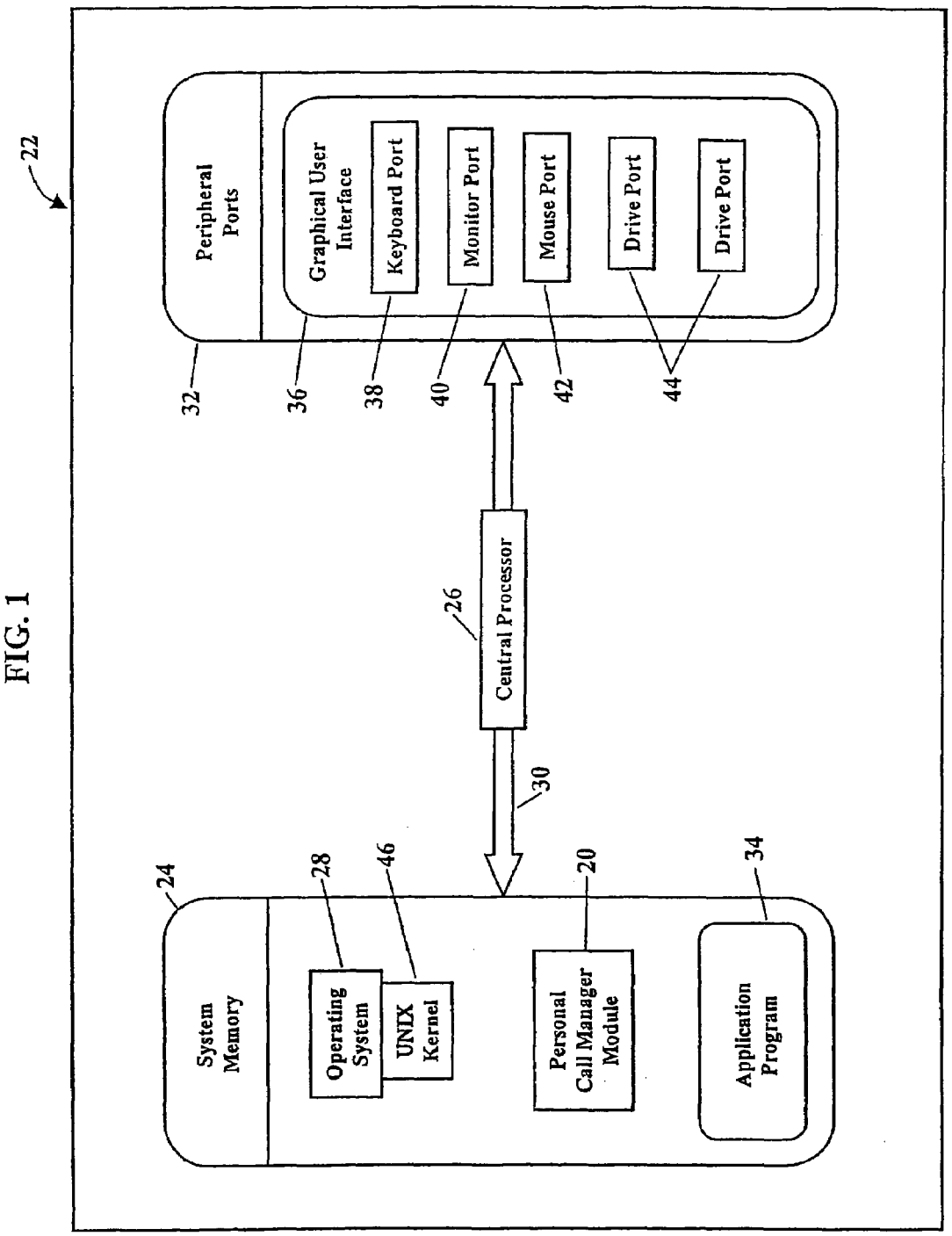
FIG. 1 is a block diagram showing the Personal Call Manager module residing in a computer system.

The present invention particularly relates to methods and to systems for providing a usage pattern for a customer of a telecommunications system. These methods and systems operate within Advanced Intelligent Network (AIN) components in an intelligent switched telephone network. The usage pattern provides real-time and historical information concerning the customer's use of the telecommunications system. The usage pattern shows, or audibly tells, the customer what calls were made, to whom the call was made, what calls were received, from whom the call was received, the times and dates of calls, and other useful, real-time and historical telephone information. The usage pattern may even show the number of minutes remaining on monthly package plans or monthly measured use plans. The customer may then use this usage pattern to efficiently and to economically manage their use of telephone service.

One embodiment describes a method for providing a usage pattern for a customer of a telecommunications system. The method describes communicating with a data network and receiving a query for the customer's usage pattern. The query originates from the customer using a computer device operating on the data network. The usage pattern may be acquired from at least one of i) a service control point operating on the telecommunications system and ii) a database operating on the data network. The method then causes the usage pattern to be communicated along the data network to the computer device. The customer may then use the computer device to access the usage pattern.

Another embodiment helps ensure confidentiality of the usage pattern. Here the method communicates with a data network and receives a query for the customer's usage pattern. The query originates from the customer using a computer device operating on the data network. The identity of the customer is verified to help ensure privacy of the usage pattern. If the identity of the customer is verified/ authorized, the usage pattern is acquired from a database communicating with a Service Control Point. The usage pattern comprises at least one of i) the number of telephone calls made by the customer during a billing cycle, ii) the number of telephone calls received by the customer during the billing cycle, iii) telephone numbers called by the customer during the billing cycle, iv) telephone numbers calling the customer during the billing cycle, v) date of each telephone call made by the customer during the billing cycle, vi) time of each telephone call made by the customer during the billing cycle, vii) duration of each telephone call made by the customer during the billing cycle, viii) identity of a calling party terminating a call before the customer answers the call, and ix) the number of unused minutes remaining in the billing cycle. When the usage pattern is acquired, the usage pattern is communicated along the data network to the computer device. The customer may then use the computer device to access the usage pattern.

A further embodiment also describes a method for providing a usage pattern for a customer of a telecommunications system. The telecommunications system includes an intelligent switched telephone network having a plurality of Advanced Intelligent Network (AIN) components. The usage pattern provides real-time and historical information concerning the customer's use of the telecommunications system. The method receives a query for the usage pattern, with the query originating from a device communicating with the telecommunications system. The method causes the telecommunications system to acquire the usage pattern from at least one of i) a service control point and ii) a data network. The service control point operates on the telecommunications system and comprises the usage pattern for the customer. The data network communicates with the service control point and may also comprise the usage pattern for the customer. The method then causes the usage pattern to be routed along the telecommunications system to the device. The customer may use the device to access the usage pattern.

Still another aspect is explained. This aspect receives a query for the usage pattern from a device communicating with the telecommunications system. The identity of the customer is verified/authorized to help ensure privacy of the usage pattern. The method causes the telecommunications system to acquire the usage pattern for the customer. The usage pattern comprises at least one of i) the number of telephone calls made by the customer during a billing cycle, ii) the number of telephone calls received by the customer during the billing cycle, iii) telephone numbers called by the customer during the billing cycle, iv) telephone numbers calling the customer during the billing cycle, v) date of each telephone call made by the customer during the billing cycle, vi) time of each telephone all made by the customer during the billing cycle, vii) duration of each telephone call made by the customer during the billing cycle, viii) identity of a calling party terminating a call before the customer answers the call, and ix) the number of unused minutes remaining in the billing cycle. The method then causes the usage pattern to be routed along the telecommunications system to the device. The customer may use the device to access the usage pattern.

Another embodiment describes a method of acquiring a usage pattern for a customer of a telecommunications system. The usage pattern provides real-time and historical information concerning the customer's use of the telecommunications system. The method acquires the usage pattern from at least one of i) the telecommunications systems and ii) a data network. The usage pattern comprises at least one of i) the number of telephone calls made by the customer during a billing cycle, ii) the number of telephone calls received by the customer during the billing cycle, iii) telephone numbers called by the customer during the billing cycle, iv) telephone numbers calling the customer during the billing cycle, v) date of each telephone call made by the customer during the billing cycle, vi) time of each telephone call made by the customer during the billing cycle, vii)

duration of each telephone call made by the customer during the billing cycle, viii) identity of a calling party terminating a call before the customer answers the call, and ix) the number of unused minutes remaining in the billing cycle. The method then displays the acquired usage pattern via a user interface on a device.

A system is also disclosed for providing a usage pattern for a customer of a telecommunications system. The usage pattern provides real-time and historical information concerning the customer's use of the telecommunications system. The system has a processor and a database of usage patterns. Each usage pattern comprises at least one of i) the number of telephone calls made by the customer during a billing cycle, ii) the number of telephone calls received by the customer during the billing cycle, iii) telephone numbers called by the customer during the billing cycle, iv) telephone numbers calling the customer during the billing cycle, v) date of each telephone call made by the customer during the billing cycle, vi) time of each telephone call made by the customer during the billing cycle, vii) duration of each telephone call made by the customer during the billing cycle, viii) identity of a calling party terminating a call before the customer answers the call, and ix) the number of unused minutes remaining in the billing cycle. The processor accesses the database of usage patterns and acquires the usage pattern.

A public switched telephone network is also disclosed. The public switched telephone network processes a telephone call, and the public switched telephone network includes Advanced Intelligent Network (AIN) components. One such AIN component is a Service Control Point (SCP) processing system for providing usage pattern service to a subscriber. The Service Control Point processing system comprises a processor accessing a database of usage patterns. Each usage pattern comprises at least one of i) the number of telephone calls made by the customer during a billing cycle, ii) the number of telephone calls received by the customer during the billing cycle, iii) telephone numbers called by the customer during the billing cycle, iv) telephone numbers calling the customer during the business cycle, v) date of each telephone call made by the customer during the billing cycle, vi) time of each telephone call made by the customer during the billing cycle, vii) duration of each telephone call made by the customer during the billing cycle, viii) identity of a calling party terminating a call before the customer answers the call, and ix) the number of unused minutes remaining in the billing cycle.

Figure 2:
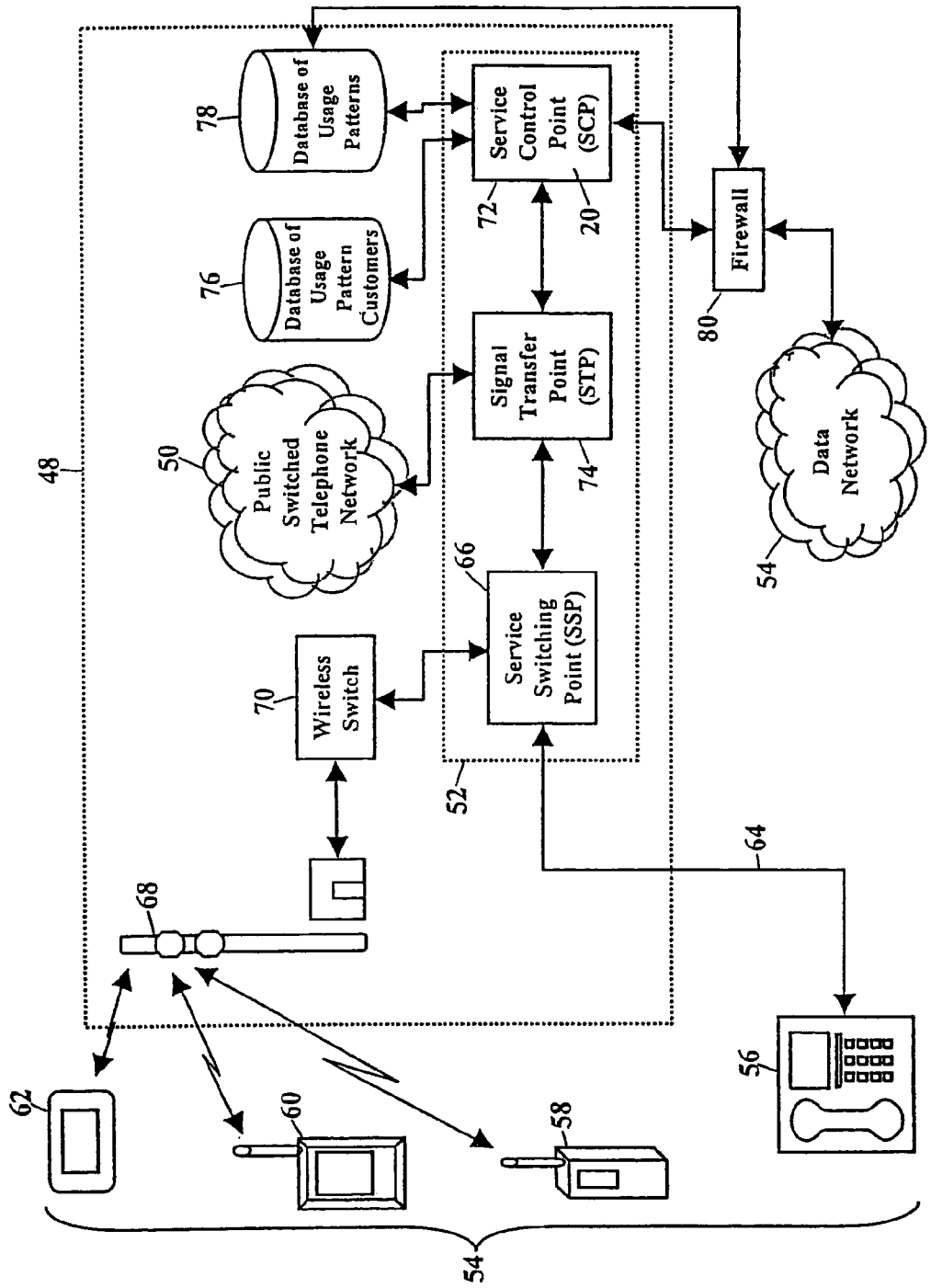
FIG. 2 is a schematic diagram of a telecommunications system incorporating the Personal Call Manager module.

FIGS. 1 and 2 depict a possible operating environment for an embodiment of the present invention. This embodiment of a Personal Call Manager module 20 comprises a computer program and database that acquires a usage pattern for a customer of a telecommunications system. The usage pattern provides real-time and historical information concerning the customer's use of the telecommunications system. The usage pattern describes the number of telephone calls made by the customer, the number of telephone calls received by the customer, telephone numbers called and received by the customer, date, time, and duration of telephone calls made by the customer, the number of unused minutes remaining in a billing cycle, and other historical information to help manage the customer's use of the telecommunications system. As those of ordinary skill in the art of computer programming recognize, computer processes/programs are depicted as process and symbolic representations of computer operations. Computer components, such as a central processor, memory devices, and display devices, execute these computer operations. The computer operations include manipulation of data bits by the central processor, and the memory devices maintain the data bits in data structures. The process and symbolic representations are understood, by those skilled in the art of computer programming, to convey the discoveries in the art.

FIG. 1 is a block diagram showing the personal Call Manager module 20 residing in a computer system 22. The Personal Call Manager module 20 operates within a system memory device 24. The computer system 22 also has a central processor 26 executing an operating system 28. The operating system 28, as is well known, has a set of instructions that control the internal functions of the computer system 22. A system bus 30 communicates signals, such as data signals, control signals, and address signals, between the central processor 26, the system memory device 24, and at least one peripheral port 32. Those of ordinary skill in the art understand that the program, processes, methods, and systems described in this patent are not limited to any particular computer system or computer hardware.

Those of ordinary skill in the art also understand the central processor 26 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450). The Intel Corporation also manufactures a family of X86 and P86 microprocessors (Intel Corporation, 2200 Mission College Blvd., Santa Clara, Calif. 95052-8119, 408.765.8080). Other manufacturers also offer microprocessors. Such other manufacturers include Motorola, Inc. (1303 East Algonquin Road, P.O. Box A3309 Schaumburg, Ill. 60196), International Business Machines Corp. (New Orchard Road, Armonk, N.Y. 10504, (914) 499-1900), and Transmeta Corp. (3940 Freedom Circle, Santa Clara, Calif. 95054). While only one microprocessor is shown, those skilled in the art also recognize multiple processors may be utilized. Those skilled in the art further understand that the program, processes, methods, and systems described in this patent are not limited to any particular manufacturer's central processor.

The preferred operating system 28 is the UNIX® operating system (UNIX® is a registered trademark of the Open Source Group). Those skilled in the art also recognize many other operating systems are suitable. Other suitable operating systems include UNIX-based Linux, WINDOWS NT® (WINDOWS NT® is a registered trademark of Microsoft Corporation, One Microsoft Way, Redmond Wash. 98052-6399, 425.882.8080), and Mac® OS (Mac® is a registered trademark of Apple Computer, Inc., 1 Infinite Loop, Cupertino, Calif. 95014, 408.996.1010). Those of ordinary skill in the art again understand that the program, processes, methods, and systems described in this patent are not limited to any particular operating system.

The system memory 24 may also contain an application program 34. The application program 34 cooperates with the operating system 28 and with the at least one peripheral port 32 to provide a Graphical User Interface (GUI) 36. The Graphical User Interface 36 is typically a combination of signals communicated along a keyboard port 38, a monitor port 40, a mouse port 42, and one or more drive ports 44. As those of ordinary skill well understand, a kernel portion 46 of the preferred UNIX® operating system 28 manages the interface between the application program 34, the input/output devices (the keyboard port 38, the monitor port 40, the mouse port 42, or the drive ports 44), the system memory 24, and the scheduling and maintenance of the file access system 20.

FIG. 2 is a schematic diagram of a telecommunications system 48 incorporating the Personal Call Manager module 20. This telecommunications system 48 further represents an operating environment for the Personal Call Manager module 20. The telecommunications system 48 includes the familiar Public Switched Telephone Network 50 and an Advanced Intelligent Network (AIN) 52 controlling many features of the Public Switched Telephone Network 50. The telecommunications system 48 may also interface with a data network 54 to share and to retrieve information necessary to process telephone calls. The telecommunications system 48, the Advanced Intelligent Network 52, and the interfacing data network 54, however, are well understood and will only be simply described. If a reader desires a more detailed explanation, the reader is directed to U.S. Pat. No. 5,430,719 issued to Weisser (Jul. 4, 1995) and to U.S. Pat. No. 5,917,817 issued to Dunn et al. (Jun. 29, 1999), with each incorporated herein by reference in their entirety.

As FIG. 2 shows, a customer places a call using a telephonic device 54. As those of ordinary skill in the art of telephony understand, the telephonic device 54 could be a common telephone 56, a wireless telephone 58, a wireless personal data assistant 60, or a wireless pager 62. The call could be routed from the common telephone 56, along a landline 64, to a Service Switching Point (SSP) 66. The call, instead, could be wirelessly coupled to an antenna 68, then coupled to a switch 70, and then received by the Service Switching Point 66. The Service Switching Point 66 sends packets of data to a Service Control Point (SCP) 72 via a high-speed packet switch, commonly termed a Signal Transfer Point (STP) 74. These packets of data may include the telephone number of the called party and the telephone number of the calling party. The Service Switching Point 66 then suspends processing the call and waits for instructions from the Service Control Point 72.

The Service Control Point 72 determines if a usage pattern service is required. The usage pattern service, as earlier described, provides historical information concerning a subscriber's use of the telecommunications system 48. The Personal Call Manager module 20 comprises a computer program operating at the Service Control Point 72. The Service Control Point 72 initially accesses a database 76 of usage pattern customers. If the database 76 of usage pattern customers contains the calling party, or the called party, then the Service Control Point 72 sends processing instructions to the Service Control Point 72 via the Signal Transfer Point 74. The processing instructions instruct the Service Switching Point 66 that the usage pattern service is required and that the Service Switching Point 66 should monitor details of the call.

The details of the call are stored for retrieval. The Service Control Point 72 stores the details of the call in a database 78 of usage patterns. The usage pattern service visually shows, or audibly tells, the customer what calls were made, what calls were received, the times and dates of calls, and other historical telephone information. The usage pattern service may even show the number of minutes remaining on monthly package plans or monthly measured use plans. The Service Control Point 72 stores the details of the call in the database 78 of usage patterns. FIG. 2 shows the database 78 of usage patterns operating on the telecommunications system 48.

Figure 3:
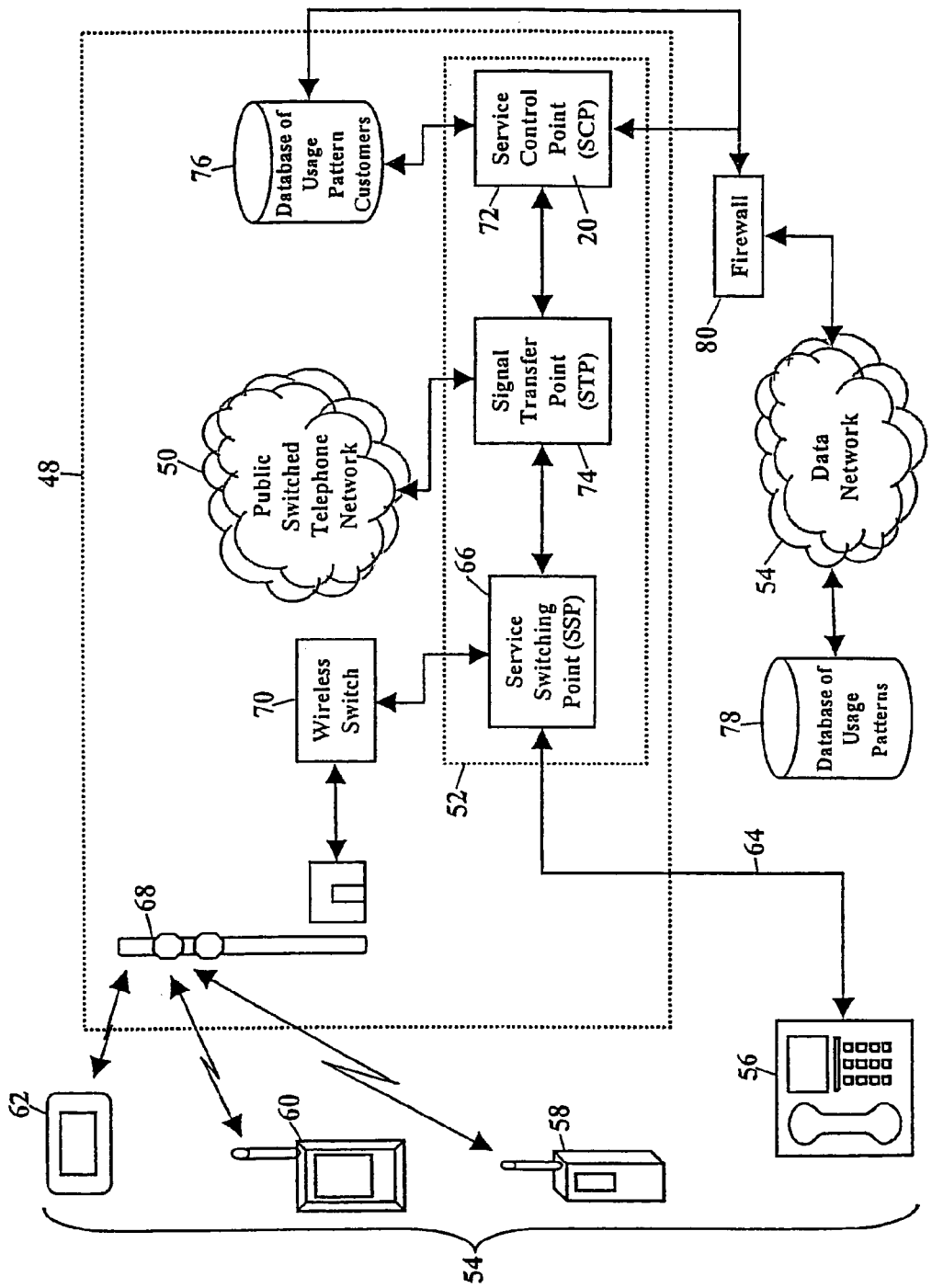
FIG. 3 is a schematic diagram of an alternative operating environment.

FIG. 3 is a schematic diagram of an alternative operating environment. FIG. 3 shows the database 78 of usage patterns operating on the data network 54. The Service Control Point 72 stores a subscriber's usage pattern on the remotely-located database 78 of usage patterns. As those of ordinary skill in the art of telephony, and in the art of computer networking, understand, the database 78 of usage patterns could be remotely maintained on a computer connected to a Local Area Network (LAN), a Wide Area Network (WAN), or a globally-distributed computing network (e.g., the "Internet"). The data network 54 could encompass a grid of communication lines through which information is shared between multiple nodes. These multiple nodes are conventionally described as network computers. As those of ordinary skill in both telephony and in computer networking understand, the data network 54 allows the Service Control Point 72 to request and acquire information from many computers physically or wirelessly connected to the data network 54. The Service Control Point 72 could negotiate a firewall security system 80, access the data network 54, and store a subscriber's usage pattern on the remotely-located database 78 of usage patterns.

Figure 4:
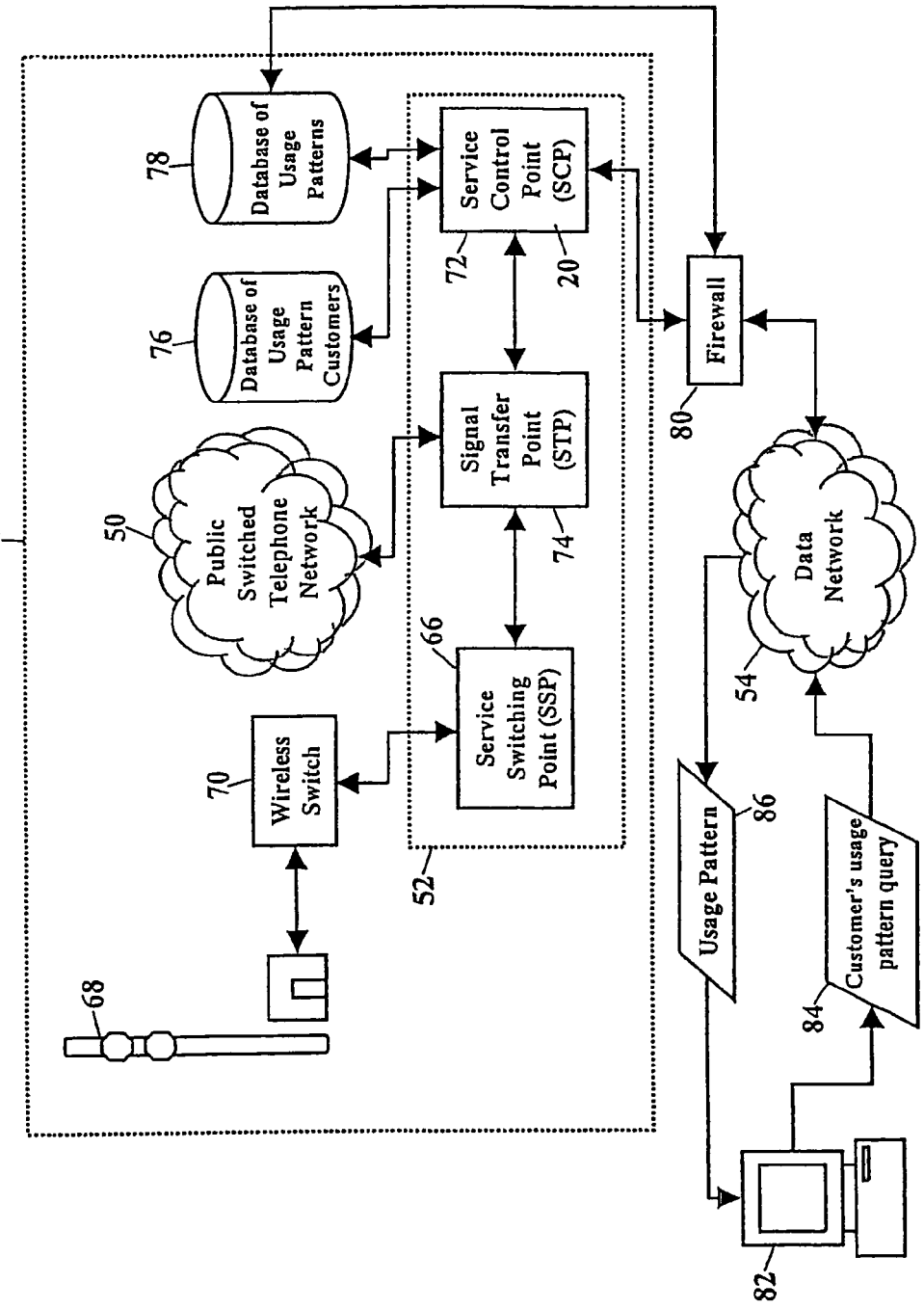
FIG. 4 is a schematic diagram showing one method for accessing a customer's usage pattern.

FIG. 4 is a schematic diagram showing one method for accessing the database 78 of usage patterns. FIG. 4 shows a customer could access their usage pattern from the data network 54. The customer, for example, may access their individual usage pattern, view or hear their monthly telecommunications use, and compare that telecommunications use to their individual telecommunications needs. The customer could use the customer's computer device 82 operating on the data network 54. The customer's computer device 82 issues a query 84 for the customer's usage pattern. The query 84 for the customer's usage pattern is communicated along the data network 54, is negotiated through the firewall 80, and is received by the database 78 of usage patterns. The customer's usage pattern 86 is then acquired, routed back to the data network 54, and communicated along the data network to the customer's computer device 82. The customer may then use the customer's computer device 82 to view or to otherwise access the usage pattern 86.

Figure 5:
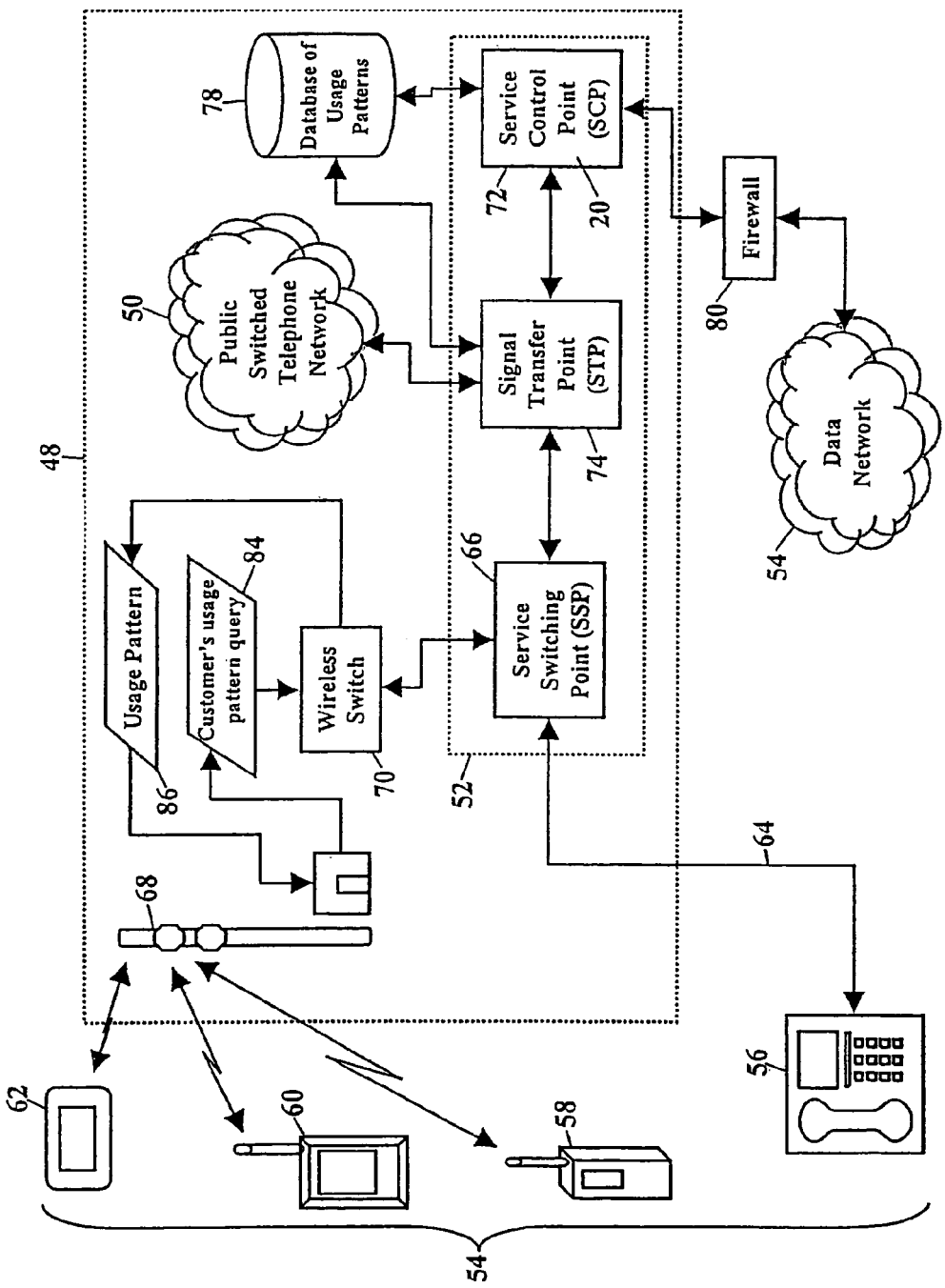
FIG. 5 is a schematic diagram showing an alternative method for accessing the customer's usages pattern.

FIG. 5 is a schematic diagram showing an alternative method for accessing the database 78 of usage patterns. FIG. 5 shows the customer could access their usage pattern from the telecommunications system 48. Here the customer could use the telephonic device 54 operating on the telecommunications system 48. The customer's wireless telephone 58, wireless personal data assistant 60, or wireless pager 62 issues the query 84 for the customer's usage pattern. The query 84 for the customer's usage pattern is wirelessly received by the antenna 68, communicated to the wireless switch 70, communicated to the Service Switching Point 66, and then communicated to the database 78 of usage patterns via the Signal Transfer Point 74. The customer's usage pattern 86 is then acquired, routed back to the Service Switching Point 66 via the Signal Transfer Point 74, routed to the wireless switch 70, and then routed to the antenna 68 for transmission. The customer's wireless telephone 58, wireless personal data assistant 60, or wireless pager 62 receives the customer's usage pattern 86, and the customer may then view or otherwise access the usage pattern 86.

Figure 6:
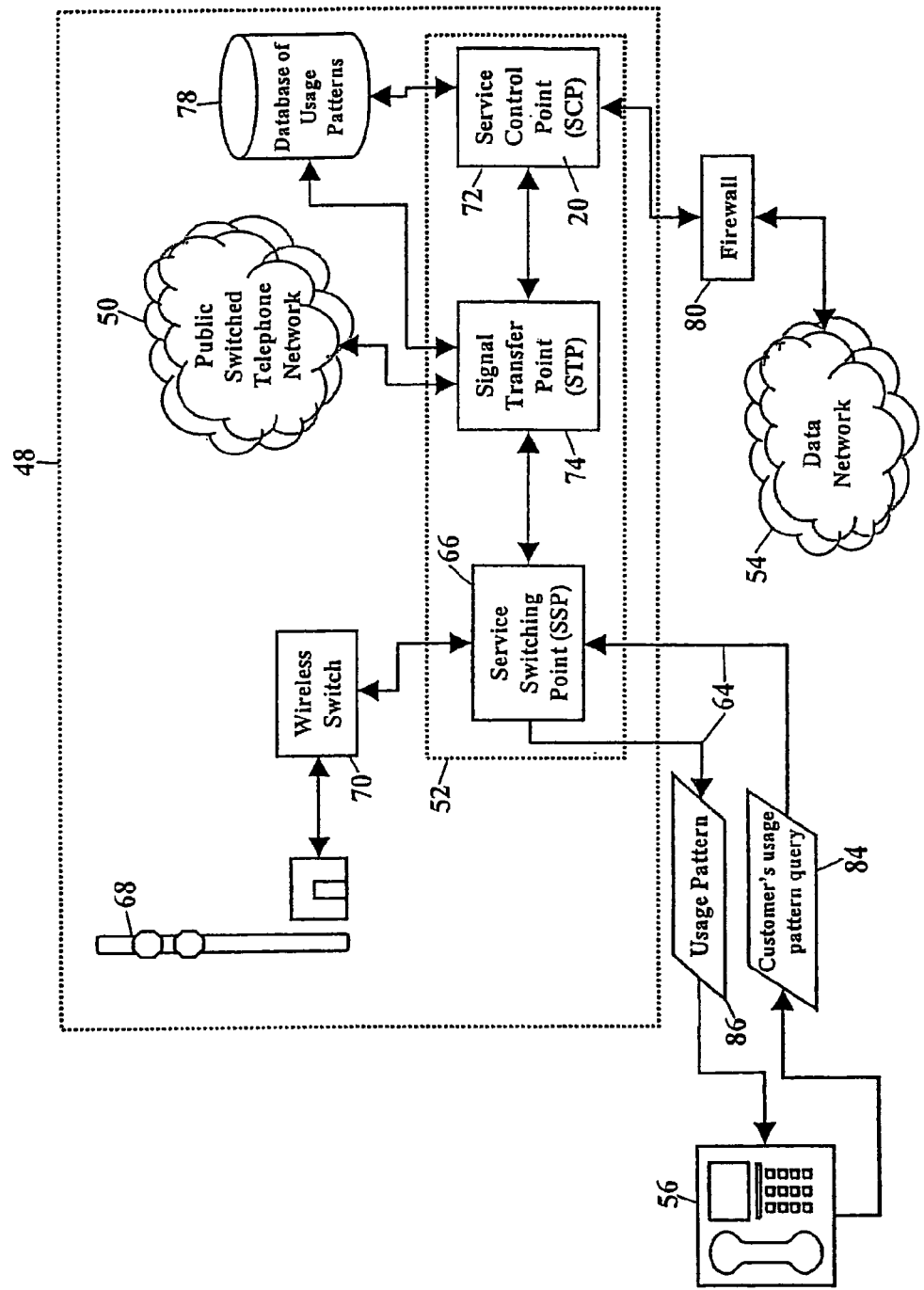
FIG. 6 is a schematic diagram showing still another method for accessing the customer's usage pattern.

FIG. 6 is a schematic diagram showing still another an alternative method for accessing the database 78 of usage patterns. FIG. 6 shows the customer could orally access their usage pattern using the common telephone 56 operating on the telecommunications system 48. The customer could call an access number and retrieve their usage pattern. The customer, for example, could call a "Universal Call Control" system, in response to the customer's call, "talks" to the customer and provides information on the customer's communication services. The Universal Call Control system may audibly read the customer's usage pattern contained in the database 78 of usage patterns. The customer may then orally respond to the Universal Call Control system by simply talking into the common telephone 56 and/or by inputting data through use of the telephone keypads and dual tone multi-frequency (DTMF) tones that are understood by the Universal Call Control system.

The customer, using the common telephone 56, could access their usage pattern using voice interfaces. As FIG. 6 shows, the customer uses the common telephone 56 to issue the query 84 for the customer's usage pattern. The query 84 for the customer's usage pattern is communicated along the landline 64 to the Service Switching Point 66. The Service Switching Point 66 forwards the packet-based query 84 for the customer's usage pattern to the Signal Transfer Point 74. The Signal Transfer Point 74, as explained earlier, routes the query 84 for the customer's usage pattern to the database 78 of usage patterns. The customer's usage pattern 86 is then acquired, routed back to the Service Switching Point 66 via the Signal Transfer Point 74, and returned along the landline 64 to the common telephone 56. Whatever voice interface is used, the customer may audibly access their usage pattern and orally request usages options.

While there are many voice interfaces, one such voice interface is VoiceXML. A VoiceXML (also referred to as VOXml) gateway may be included in the Public Switched Telephone Network 50, and/or the data network 54, to enable the communication. VoiceXML is an acronym for Voice extensible markup language. VoiceXML is a web development language based on XML (extensible markup language). The VoiceXML gateway enables access to, and modification of, web-based information through a normal voice interface. In addition, the VoiceXML gateway provides for automatic speech recognition and/or text-to-speech communication so that there may be understandable communication between the customer, on the common telephone 56, and, for example, the Universal Call Control system.

The customer could also use the Universal Call Control system to update their subscription services. The Universal Call Control system allows the customer to request a full array of calling features. The customer, for example, could use the Universal Call Control system and subscribe to call forwarding, call waiting, multi-party calling, the usage pattern service, and other enhancements. The customer, of course, could also use the Universal Call Control system to de-subscribe to any calling feature. The usage pattern service, therefore, could be selected, and de-selected, using the customer's computer (shown as reference numeral 82 in FIG. 4), or telephonic device (shown as reference numeral 54 in FIG. 5).

Figure 7:
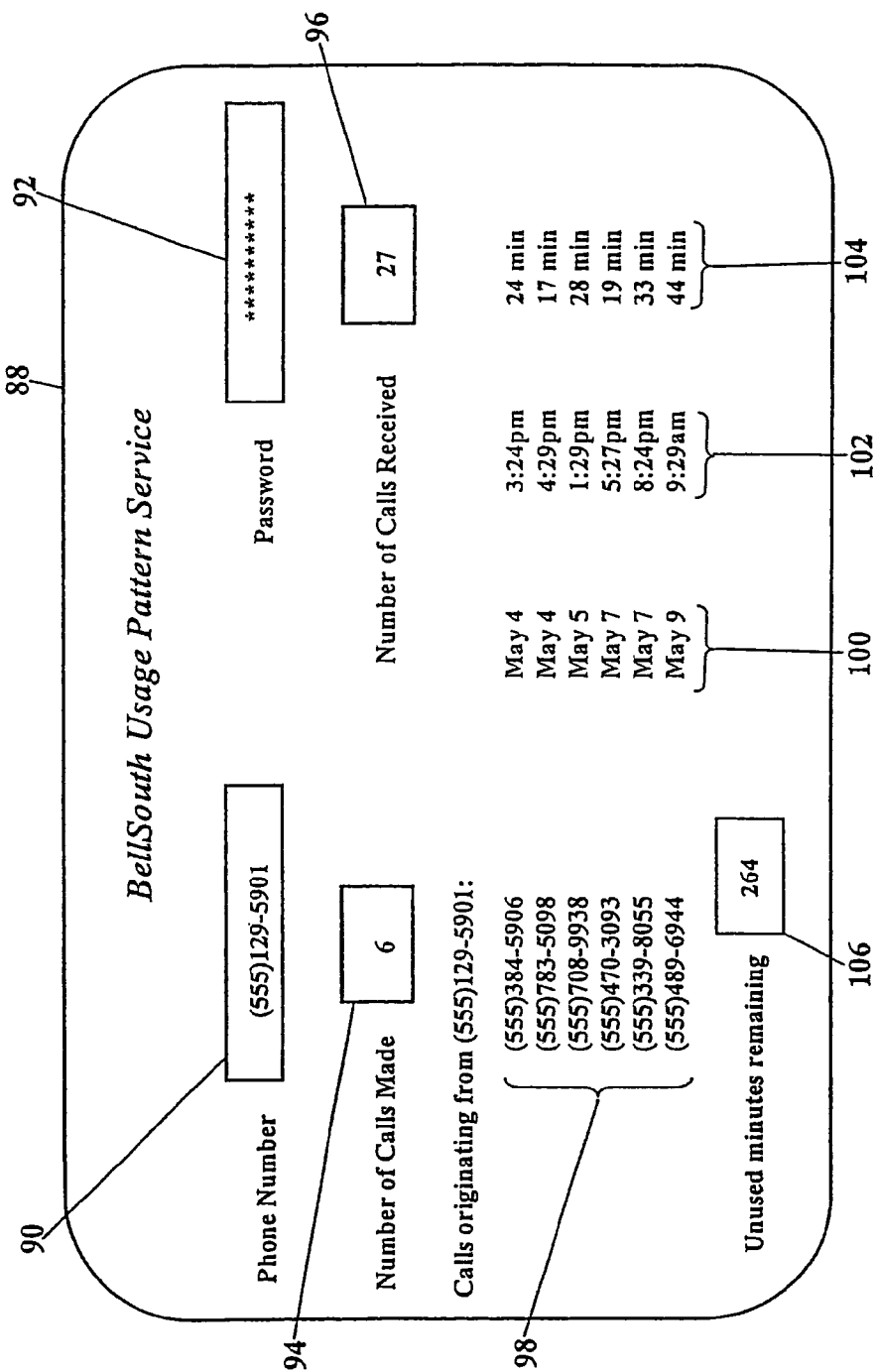
FIGS. 7-11 are schematic drawings of a user interface for displaying the customer's usage pattern.

FIGS. 7-11 are schematic drawings of a user interface 88 for displaying usage patterns. A customer/subscriber could access the user interface to view their usage pattern. FIG. 7 shows the customer/subscriber could enter a phone number 90 for which the usage pattern is sought. The customer/subscriber may even be required to enter a password 92 or other identifying factor. Such authorization/verification process could help ensure a customer's/subscriber's usage pattern remains private and confidential. Once the usage pattern is acquired, the user interface 88 could then display various historical information to help the customer/subscriber review and monitor their telecommunications use. The user interface 88, for example, could display the number of telephone calls made by the customer 94 and the number of telephone calls received by the customer 96. The customer/subscriber could also view telephone numbers 98 called by the customer, a date 100 of each telephone call made by the customer, a time 102 of day that each telephone call was made by the customer, and the duration 104 of the telephone call. Displaying unused minutes 106 remaining in a billing cycle would be of great benefit to customers/subscribers on monthly package plans or monthly measured use plans.

Figure 8:
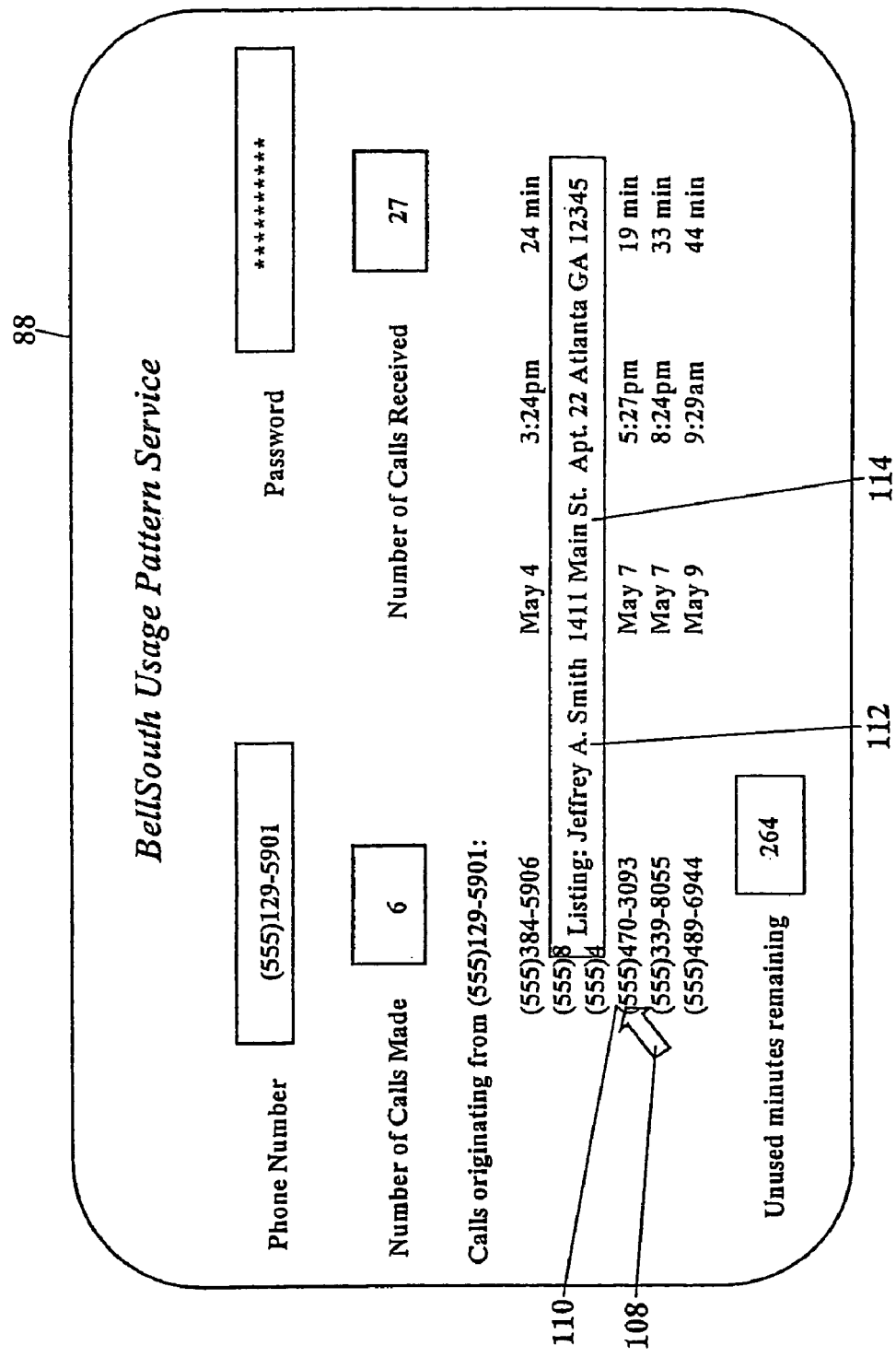

FIG. 8 shows the user interface 88 could display additional historical information. As the customer/subscriber reviews the called telephone numbers 98, the customer/subscriber may not recognize a telephone number. The customer/subscriber could then select the unrecognized telephone number and view the listed name of the called party and/or a listed address of the called party. FIG. 8, for example, shows placing a cursor 108 within the data field of a particular called telephone number 110 causes the user interface 88 to display the listed name 112 of the called party and/or the listed address 114 of the called party. Such features benefit both the customer/subscriber and telecommunications service provider. Customers may themselves learn the identity of unrecognized telephone numbers and refresh their memory of the call. Because customers may themselves learn the identity of unrecognized telephone numbers, fewer customers call the service provider and, thus, the efforts of service representatives are better utilized on more pressing concerns.

Figure 9:
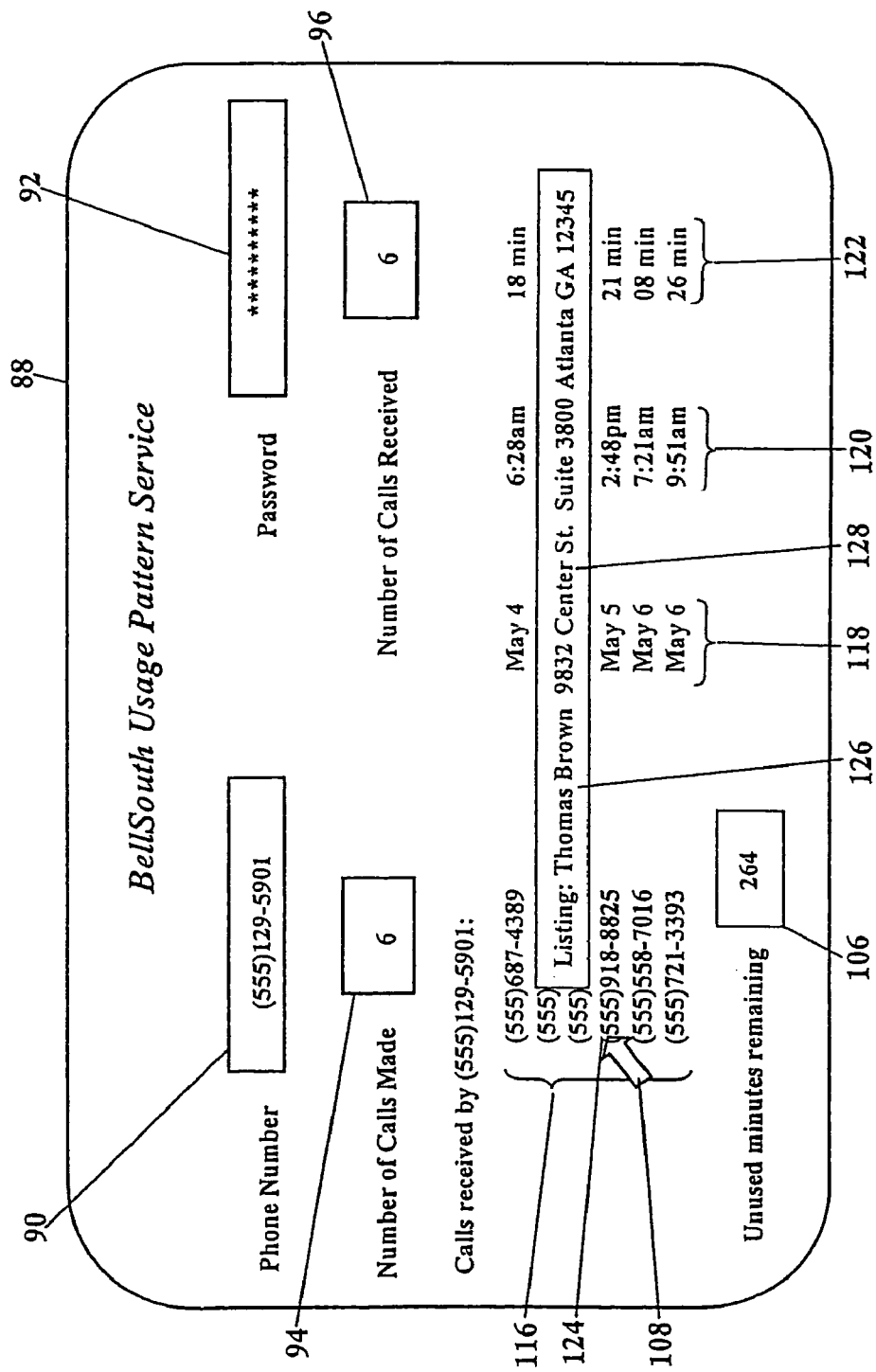

FIG. 9 shows the user interface 88 could display calling party information the customer/subscriber could also view telephone numbers 116 received by the customer, a date 118 and a time 120 each telephone call was received, and the duration 122 of the received telephone call. If a telephone number is not recognized, as before, the customer/subscriber places the cursor 108 within the data field of a particular received telephone number 124 to display the name 126 of the calling party and/or an address 128 of the calling party. Such features, again, benefit both the customer/subscriber and the telecommunications service provider.

Figure 10:
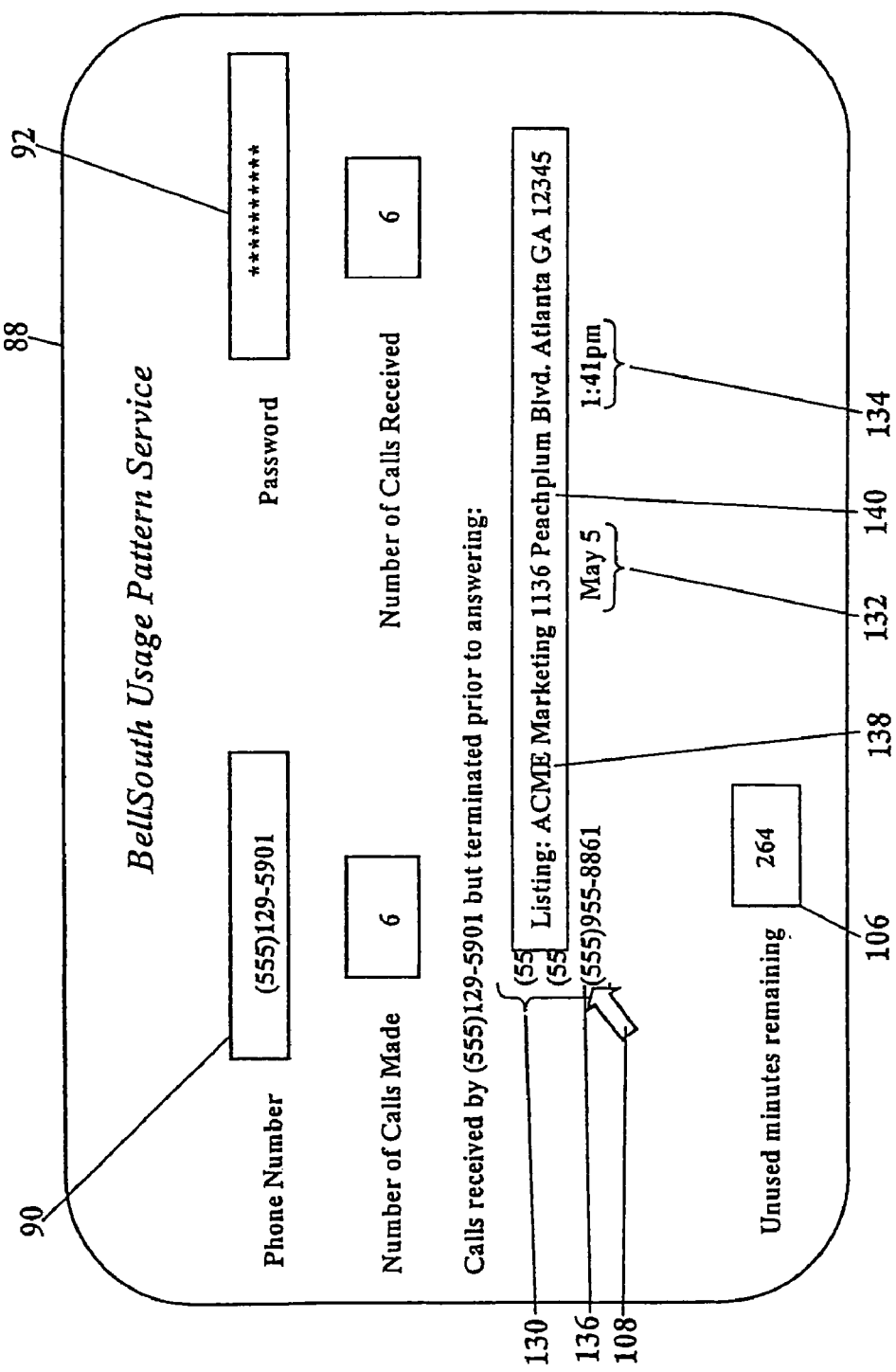

FIG. 10 shows the user interface 88 could display even more information. A customer/subscriber may wish to know the identity of a calling party who terminates the telephone call before the customer answers. The user interface 88, for example, could display telephone numbers 130 placing calls to the customer/subscriber, but, terminating the call before answer. A date 132 and time 134 of each terminated telephone call could also be displayed. If the telephone number is not recognized, as before, the customer/subscriber could place the cursor 108 within the data field of a particular terminated telephone number 136 to display the name 138 of the calling party and/or an address 140 of the calling party.

Figure 11:
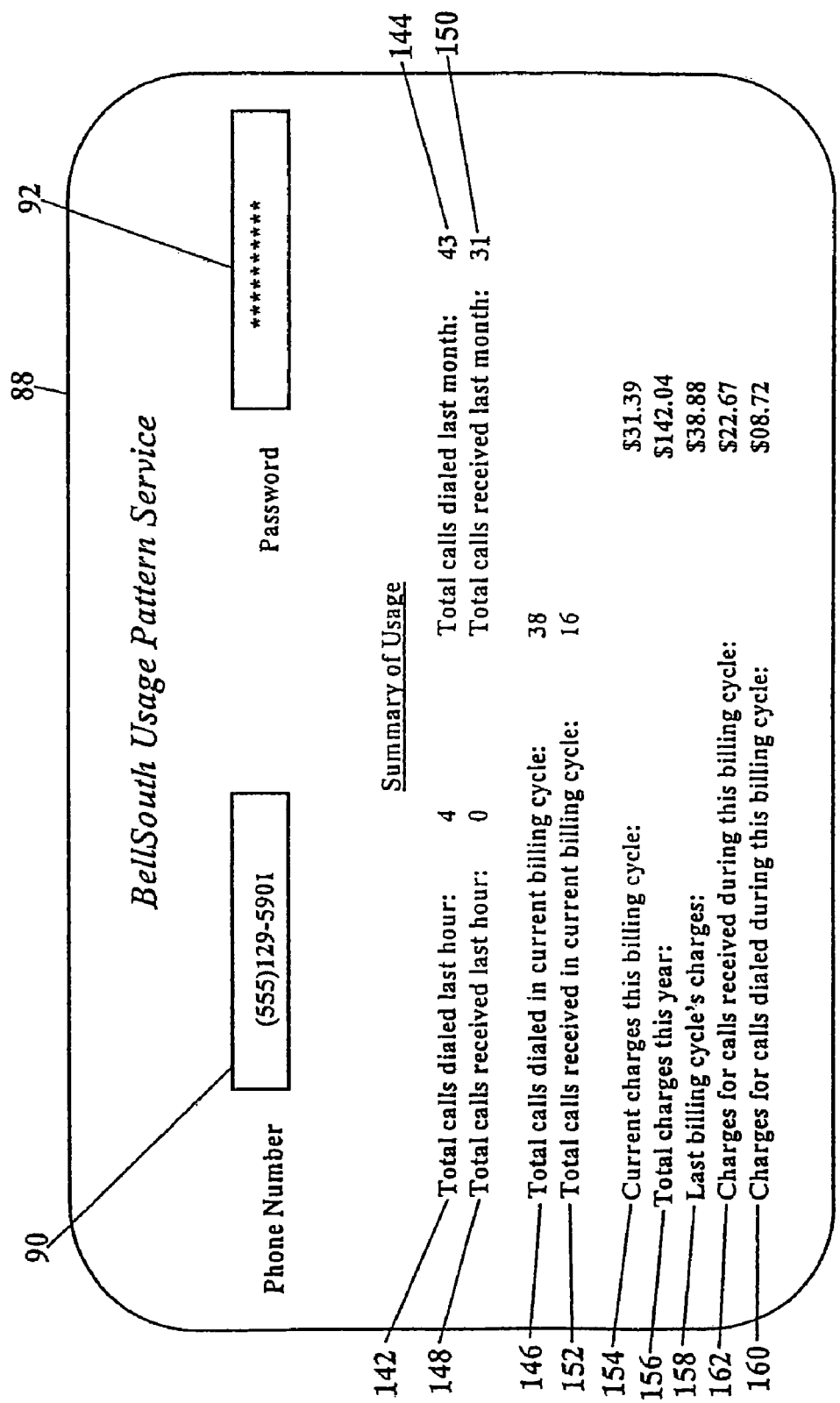

FIG. 11 shows the user interface 88 could display summary information a customer/subscriber may wish to quickly review their usage pattern for basic, summary information. Although the customer/subscriber could customize the user interface 88 for what the customer/subscriber considers "summary information," FIG. 11 shows some additional information that could be displayed. The customer/subscriber could view the total number of calls made during a chronological interval 142, the total number of calls made during a calendar interval 144, and the total number of calls made during a billing cycle 146. The customer/subscriber, likewise, could view the total number of calls received during a chronological interval 148, the total number of calls received during a calendar interval 150, and the total number of calls received during a calendar interval 150, and the total number of calls received during the billing cycle 152. The customer/subscriber, of course, could specify or customize the "chronological" or "calendar" interval. The customer/subscriber could also view various billing information, such as charges incurred in the current billing cycle 154, year-to-date charges 156, charges incurred in past billing cycles 158, and even charges for calls made by the customer 160 and calls received by the customer 162. Such summary information would, again, be of great benefit to customers/subscribers on monthly package plans or monthly measured use plans.

The usage pattern service could also incorporate a "click-to-dial" feature. As FIGS. 7-11 suggest, a customer/subscriber could also dial telephone numbers from the user interface 88. As the customer/subscriber views the list of telephone numbers called by the customer (shown as reference numeral 98 in FIG. 7), the customer/subscriber could place the cursor (shown as reference numeral 108 in FIGS. 8-10) on a specific telephone number. The customer/subscriber could then use a computer mouse or other pointing device to "click" on the specific telephone number. This procedure could then initiate a landline/wireless telephone call to that specific telephone number.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A method for providing a usage pattern for a subscriber of a telecommunications system, the usage pattern providing information concerning the subscriber's use of the telecommunications system, the method comprising:
   communicating with a data network and receiving a query for the customer's usage pattern, the query originating from the customer using a computer device operating on the data network;
   acquiring the usage pattern,
   causing the usage pattern to be communicated along the data network to the computer device;
   wherein the customer uses the computer device to access the usage pattern; and
   allowing the customer to learn an identity of an unrecognized telephone number in the usage pattern.

2. The method of claim 1 further comprising:
   verifying an identity of the customer to help ensure privacy of the usage pattern.

3. The method of claim 1 wherein:
   the usage pattern comprising at least one of
      the number of telephone calls made by the customer during a billing cycle,
      the number of telephone calls received by the customer during the billing cycle,
      telephone numbers called by the customer during the billing cycle,
      telephone numbers calling the customer during the billing cycle,
      date of each telephone call made by the customer during the billing cycle,
      time of each telephone call made by the customer during the billing cycle,
      duration of each telephone call made by the customer during the billing cycle,
      identity of a calling party terminating a call before the customer answers the call, and
      the number of unused minutes remaining in the billing cycle.

4. The method of claim 1 further comprising:
   causing the acquired usage pattern to be compared with a predetermined billing plan of the billing cycle; and
   displaying unused minutes remaining in the predetermined billing plan on the computer device to control the use of the telecommunications system based on the unused minutes.

5. A system for providing a usage pattern for a customer of a telecommunications system, the usage pattern providing historical information concerning the customer's use of the telecommunications system, the system comprising:
   a computer executing a personal call manager module for implementing:
      communicating with a data network and receiving a query for the customer's usage pattern, the query originating from the customer using a computer device operating on the data network;
      acquiring the usage pattern,
      causing the usage pattern to be communicated along the data network to the computer device;
      wherein the customer uses the computer device to access the usage pattern; and
      allowing the customer to learn an identity of an unrecognized telephone number in the usage pattern.

6. The system of claim 5 wherein the personal call manager module further implements:
   verifying an identity of the customer to help ensure privacy of the usage pattern.

7. The system of claim 5 wherein:
   the usage pattern comprising at least one of
      the number of telephone calls made by the customer during a billing cycle,
      the number of telephone calls received by the customer during the billing cycle,
      telephone numbers called by the customer during the billing cycle,
      telephone numbers calling the customer during the billing cycle,
      date of each telephone call made by the customer during the billing cycle,
      time of each telephone call made by the customer during the billing cycle,
      duration of each telephone call made by the customer during the billing cycle,
      identity of a calling party terminating a call before the customer answers the call, and
      the number of unused minutes remaining in the billing cycle.

8. The system of claim 5 wherein the personal call manager module further implements:
   causing the acquired usage pattern to be compared with a predetermined billing plan of the billing cycle; and
   displaying unused minutes remaining in the predetermined billing plan on the computer device to control the use of the telecommunications system based on the unused minutes.

9. A computer program product for providing a usage pattern for a subscriber of a telecommunications system, the usage pattern providing information concerning the subscriber's use of the telecommunications system, the computer program product comprising:
   a storage medium readable by a processing circuit and storing instructions for execution by the processing circuit for facilitating a method comprising:
      communicating with a data network and receiving a query for the customer's usage pattern, the query originating from the customer using a computer device operating on the data network;

acquiring the usage pattern, causing the usage pattern to be communicated along the data network to the computer device;

wherein the customer uses the computer device to access the usage pattern; and allowing the customer to learn an identity of an unrecognized telephone number in the usage pattern.

10. The computer program product of claim 9 further comprising instructions for execution by the processing circuit for facilitating:

verifying an identity of the customer to help ensure privacy of the usage pattern.

11. The computer program product of claim 9 wherein: the usage pattern comprising at least one of the number of telephone calls made by the customer during a billing cycle, the number of telephone calls received by the customer during the billing cycle, telephone numbers called by the customer during the billing cycle, telephone numbers calling the customer during the billing cycle, date of each telephone call made by the customer during the billing cycle, time of each telephone call made by the customer during the billing cycle, duration of each telephone call made by the customer during the billing cycle, identity of a calling party terminating a call before the customer answers the call, and the number of unused minutes remaining in the billing cycle.

12. The computer program product of claim 9 further comprising instructions for execution by the processing circuit for facilitating:

causing the acquired usage pattern to be compared with a predetermined billing plan of the billing cycle; and displaying unused minutes remaining in the predetermined billing plan on the computer device to control the use of the telecommunications system based on the unused minutes.

* * * * *